US012028735B2

(12) United States Patent
Zhou et al.

(10) Patent No.: US 12,028,735 B2
(45) Date of Patent: *Jul. 2, 2024

(54) BEAM INDICATION REUSE

(71) Applicant: QUALCOMM Incorporated, San Diego, CA (US)

(72) Inventors: Yan Zhou, San Diego, CA (US); Alexandros Manolakos, Escondido, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,590

(22) Filed: Nov. 21, 2022

(65) Prior Publication Data

US 2023/0094839 A1 Mar. 30, 2023

Related U.S. Application Data

(63) Continuation of application No. 16/830,800, filed on Mar. 26, 2020, now Pat. No. 11,510,082.

(Continued)

(51) Int. Cl.
*H04W 24/10* (2009.01)
*H04B 7/0408* (2017.01)
(Continued)

(52) U.S. Cl.
CPC ............. *H04W 24/10* (2013.01); *H04L 5/001* (2013.01); *H04L 5/0048* (2013.01);
(Continued)

(58) Field of Classification Search
CPC ..... H04L 5/001; H04L 5/0048; H04L 5/0053; H04W 72/042; H04W 72/0453; H04W 76/11; H04W 76/27
See application file for complete search history.

(56) References Cited

U.S. PATENT DOCUMENTS 9,019,836 B2 4/2015 Klingenbrunn et al.
10,893,431 B2 1/2021 Liou et al.
(Continued)

FOREIGN PATENT DOCUMENTS

CN 109076364 A 12/2018
CN 109076560 A 12/2018
(Continued)

OTHER PUBLICATIONS

"3rd Generation Partnership Project; Technical Specification Group Radio Access Network; NR; Radio Resource Control (RRC) protocol specification (Release 15)", 3GPP Standard; Technical Specification; 3GPP TS 38.331, 3rd Generation Partnership Project, Mobile Competence Centre, 650, Route Des Lucioles, F-06921, Sophia-Antipolis Cedex, France, vol. RAN WG2, No. V15.1.0, Apr. 2, 2018, pp. 1-268, XP051450735.

(Continued)

*Primary Examiner* — Eric Nowlin
(74) *Attorney, Agent, or Firm* — QUALCOMM Incorporated

(57) ABSTRACT

Certain aspects of the present disclosure provide techniques for beam indication set reuse. A method for a wireless communication that may be performed by a user equipment (UE) includes receiving signaling configuring the UE with a beam indication set. The method includes receiving an indication to apply the configured beam indication set to multiple bandwidth parts (BWPs) and/or multiple component carriers (CCs). The method includes applying the beam indication set to a BWP or CC based on the indication. The beam indication set may be for uplink or downlink communications. The beam indication set may be a transmission configuration indicator (TCI) state set or spatial relation set. Other aspects and features are also claimed and described.

24 Claims, 11 Drawing Sheets

Related U.S. Application Data

(60) Provisional application No. 62/826,918, filed on Mar. 29, 2019, provisional application No. 62/826,907, filed on Mar. 29, 2019, provisional application No. 62/826,953, filed on Mar. 29, 2019.

(51) Int. Cl.
    *H04L 5/00*     (2006.01)
    *H04W 72/0453*     (2023.01)
    *H04W 72/23*     (2023.01)
    *H04W 76/11*     (2018.01)
    *H04W 76/27*     (2018.01)

(52) U.S. Cl.
CPC .......... *H04B 7/0408* (2013.01); *H04L 5/0053* (2013.01); *H04W 72/0453* (2013.01); *H04W 72/23* (2023.01); *H04W 76/11* (2018.02); *H04W 76/27* (2018.02)

(56) References Cited

U.S. PATENT DOCUMENTS

| | | | |
|---|---|---|---|
| 11,057,184 | B2 | 7/2021 | Orsino et al. |
| 11,240,867 | B2 * | 2/2022 | Abdoli .............. H04W 72/0453 |
| 11,510,082 | B2 | 11/2022 | Zhou et al. |
| 11,540,158 | B2 | 12/2022 | Zhou et al. |
| 11,652,575 | B2 * | 5/2023 | Jung ...................... H04W 28/04 370/242 |
| 2018/0288746 | A1 | 10/2018 | Zhang et al. |
| 2019/0058517 | A1 | 2/2019 | Kang et al. |
| 2019/0174466 | A1 * | 6/2019 | Zhang .................. H04L 5/0057 |
| 2019/0239093 | A1 | 8/2019 | Zhang et al. |
| 2019/0393989 | A1 * | 12/2019 | Jung ...................... H04W 28/04 |
| 2020/0045569 | A1 | 2/2020 | Seo et al. |
| 2020/0137588 | A1 | 4/2020 | Zhang et al. |
| 2020/0267571 | A1 | 8/2020 | Park et al. |
| 2020/0288479 | A1 * | 9/2020 | Xi .......................... H04W 76/27 |
| 2020/0359459 | A1 | 11/2020 | Kakishima et al. |
| 2020/0389883 | A1 | 12/2020 | Faxer et al. |
| 2020/0404690 | A1 | 12/2020 | Lee et al. |
| 2021/0014848 | A1 | 1/2021 | Davydov et al. |
| 2021/0045149 | A1 | 2/2021 | Davydov et al. |
| 2021/0127450 | A1 * | 4/2021 | Abdoli .................. H04W 76/27 |
| 2021/0160835 | A1 | 5/2021 | Gao et al. |
| 2021/0168030 | A1 | 6/2021 | Li |
| 2021/0212036 | A1 | 7/2021 | Wu et al. |
| 2021/0359902 | A1 | 11/2021 | Chen et al. |
| 2021/0385807 | A1 | 12/2021 | Rahman et al. |
| 2022/0151012 | A1 * | 5/2022 | Abdoli .................. H04W 72/23 |
| 2023/0217292 | A1 | 7/2023 | Zhou et al. |
| 2023/0269030 | A1 * | 8/2023 | Jung .......................... H04L 1/08 370/242 |

FOREIGN PATENT DOCUMENTS

| | | | |
|---|---|---|---|
| CN | 110785958 A | 2/2020 | |
| CN | 111615805 A | 9/2020 | |
| CN | 112514308 A * | 3/2021 | .............. H04L 1/08 |
| EP | 3451553 A2 | 3/2019 | |
| EP | 3741066 A1 | 11/2020 | |
| EP | 3811553 A1 * | 4/2021 | .............. H04L 1/08 |
| EP | 3833081 A1 | 6/2021 | |
| EP | 3811553 A4 * | 7/2021 | .............. H04L 1/08 |
| KR | 20190143733 A * | 12/2019 | |
| RU | 2758705 C1 * | 11/2021 | .............. H04L 1/08 |
| TW | 201902158 A | 1/2019 | |
| TW | 201911896 A | 3/2019 | |
| WO | 2013116040 A2 | 8/2013 | |
| WO | 2018232090 A1 | 12/2018 | |
| WO | 2019017751 A1 | 1/2019 | |
| WO | 2019143900 A1 | 7/2019 | |
| WO | WO-2019245236 A1 * | 12/2019 | .............. H04L 1/08 |
| WO | 2020019351 A1 | 1/2020 | |
| WO | 2020119892 A1 | 6/2020 | |
| WO | 2020143909 A1 | 7/2020 | |
| WO | WO-2020168296 A1 * | 8/2020 | ............ H04W 24/08 |
| WO | 2021051402 A1 | 3/2021 | |
| WO | WO-2021078258 A1 * | 4/2021 | ........... H04L 5/0098 |
| WO | 2021246838 A1 | 12/2021 | |
| WO | WO-2022072830 A1 * | 4/2022 | ........ H04B 7/06968 |
| WO | WO-2022132631 A1 * | 6/2022 | ........... H04L 5/0048 |
| WO | WO-2022155198 A1 * | 7/2022 | |
| WO | WO-2022164999 A1 * | 8/2022 | |
| WO | WO-2022249742 A1 * | 12/2022 | |

OTHER PUBLICATIONS

AT&T: "TCI States Configuration Design to Support Dynamic BWP Switching", 3GPP Draft; R1-1800582, 3GPP TSG RAN WG1 Meeting NR AH 1801, TCI States Configuration Design to Support Dynamic BWP Switching, 3rd Generation Partnership Project (3GPP), Mobile Competence Centre, 650, Route Des Lucioles; F-06921 Sophia-Antipolis Cedex, France, vol. RAN WG1, No. Vancouver, Canada; Jan. 22, 2018-Jan. 26, 2018, Jan. 13, 2018 (Jan. 13, 2018), 1 Page, XP051384941.

Ericsson: "Clarification for Handling TCI State ID", 3GPP Draft, 3G PP TSG-RAN WG2 #105, R2-1901508, Clarification on TCI State ID, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 14, 2019 (Feb. 14, 2019), XP051602866.

Ericsson: "Maintenance for Beam Management", 3GPP Draft, 3GPP TSG-RAN WG1 Meeting #94, Tdoc R1-1809197, Maintenance for Beam Management, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018 (Aug. 11, 2018), XP051516567, 10 pages.

International Search Report and Written Opinion—PCT/US2020/025244—ISA/EPO—dated Jun. 9, 2020.

Oppo, et al., "Prevent BWP Switching for PDSCH/PUSCH Transmission", 3GPP Draft, 3GPP TSG-RAN2 #101, R2-1801761—Prevent BWP Switching for POSCH or PUSCH Transmission, 3rd Generation Partnership Project (3GPP), Mobile Competence Centre, 650, Route Des Lucioles, F-06921, Sophia-Antipolis Cedex, France, vol. RAN WG2, No. Athens, Greece, Feb. 26, 2018-Mar. 2, 2018, Feb. 13, 2018 (Feb. 13, 2018), XP051398954.

Prosecution History for U.S. Appl. No. 16/830,800 dated from Aug. 18, 2021, through Jul. 26, 2022, 99 Pages.

Qualcomm Incorporated: "Beam Management for NR", 3GPP Draft, 3GPP TSG-RAN WG1 Meeting 93, R1-1807341 Beam Management For NR, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051442533, pp. 1-11.

Qualcomm Incorporated: "Remaining Details on QCL", 3GPP TSG RAN WG1 Meeting #91, 3GPP Draft, 3GPP TSG RAN WG1 Meeting #91, R1-1720672, 3rd Generation Partnership Project (3GPP), Mobile Competence Centre, 650, Route Des Lucioles, F-06921 Sophia-Antipolis Cedex, France, vol. RAN WG1, No. Reno, Nevada, USA; Nov. 27, 2017-Dec. 1, 2017, Nov. 18, 2017 (Nov. 18, 2017), pp. 1-9, XP051370133.

Zte, et al., "Remaining Details on QCL", 3GPP Draft, 3GPP TSG RAN WG1 Meeting #91, R1-1719546, Remaining Details on QCL, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 27, 2017-Dec. 1, 2017, Nov. 18, 2017 (Nov. 18, 2017), XP051369360, pp. 1-4.

Taiwan Search Report—TW109110476—TIPO—dated Apr. 17, 2023.

3GPP TS 38.331: "3rd Generation Partnership Project; Technical Specification Group Radio Access Network; NR; Radio Resource Control (RRC) Protocol Specification (Release 15)", DRAFT_38331-F60, 3rd Generation Partnership Project, Mobile Competence Cen-

(56) References Cited

OTHER PUBLICATIONS tre, 650, Route Des Lucioles, F-06921, Sophia-Antipolis Cedex, France, vol. Ran WG2, V15.6.0 (Jun. 2019), Jun. 22, 2019 (Jun. 22, 2019), XP051751335, pp. 1-517.
Huawei, et al., "Remaining Issues on UCI Multiplexing", 3GPP TSG RAN WG1 Meeting #92, R1-1801341, Athens, Greece, Feb. 26-Mar. 2, 2018, 8 Pages, 20180217.

* cited by examiner

```
TCI-State ::=        SEQUENCE {
    tci-StateId          TCI-StateId,
    qcl-Type1            QCL-Info,
    qcl-Type2            QCL-Info                OPTIONAL,   -- Need R
    ...
}

QCL-Info ::=         SEQUENCE {
    cell                 ServCellIndex           OPTIONAL,   -- Need R
    bwp-Id               BWPId                   OPTIONAL,   -- Cond CSI-RS-In
    referenceSignal      CHOICE {
        csi-rs               NZP-CSI-RS-ResourceId,
        ssb                  SSB-Index
    },
    qcl-Type             ENUMERATED {typeA, typeB, typeC, typeD},
    ...
}
```

FIG. 3

```
TCI-State ::=                             SEQUENCE {
    tci-StateId                               TCI-StateId,
    qcl-Type1                                 QCL-Info,
    qcl-Type2                                 QCL-Info
OPTIONAL,       -- Need R
    ...
}

QCL-Info ::=                              SEQUENCE {
    cell                                      ServCellIndex
OPTIONAL,       -- Need R
    bwp-Id                                    BWP-Id
OPTIONAL,       -- Cond CSI-RS-Indicated
    referenceSignal                           CHOICE {
        csi-rs                                    NZP-CSI-RS-
ResourceId,
        ssb                                       SSB-Index
    },
    qcl-Type                                  ENUMERATED
{typeA, typeB, typeC, typeD},
    ...
}
```

FIG. 5

```
PUCCH-SpatialRelationInfo ::=        SEQUENCE {
    pucch-SpatialRelationInfoId      PUCCH-
SpatialRelationInfoId,
    servingCellId                        ServCellIndex
OPTIONAL,    -- Need S
    referenceSignal                      CHOICE {
        ssb-Index                            SSB-Index,
        csi-RS-Index                            NZP-
CSI-RS-ResourceId,
        srs                              SEQUENCE { resource                             SRS-ResourceId, uplinkBWP                            BWP-Id
                                         }
    },
    pucch-PathlossReferenceRS-Id         PUCCH-
PathlossReferenceRS-Id,
    p0-PUCCH-Id                          P0-PUCCH-Id,
    closedLoopIndex                      ENUMERATED {
i0, i1 }
}
```

FIG. 6

BEAM INDICATION REUSE

PRIORITY CLAIMS

This application is a continuation of U.S. patent application Ser. No. 16/830,800, filed Mar. 26, 2020, which claims benefit of U.S. Provisional Application No. 62/826,907, filed Mar. 29, 2019, of U.S. Provisional Application No. 62/826,918, filed Mar. 29, 2019, and U.S. Provisional Application No. 62/826,953, filed Mar. 29, 2019, all three of which are hereby assigned to the assignee hereof and hereby expressly incorporated by reference herein in their entireties as if fully set-forth below and for all applicable purposes.

TECHNICAL FIELD

Aspects of the present disclosure relate to wireless communications, and more particularly, to techniques for beam indication reuse. Some aspects allow a beam indication for a bandwidth part (BWP) or a component carrier (CC) to be applied for multiple BWPs and/or multiple CCs. The indication may reduce signaling overhead for configuring beam indications.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As demand for mobile broadband access continues to increase, there exists a need for further improvements in NR and LTE technology. Preferably, these improvements should be applicable to other multi-access technologies and the telecommunication standards that employ these technologies.

BRIEF SUMMARY OF SOME EXAMPLES

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes receiving a configuration of a beam indication sets. The method generally includes receiving an indication to apply the beam indication sets to multiple bandwidth parts (BWPs) and/or multiple component carriers (CCs). The method generally includes applying the beam indication set to a BWP or CC based on the indication.

In some examples, a beam indication set is a transmission configuration indication (TCI) state set, a spatial relation set, a set of candidate beam indications for activation, and/or a set of activated beam indications ready for communications.

In some examples, a UE receives the configuration of the beam indication set and/or the indication via radio resource control (RRC) signaling and/or a medium access control control element (MAC-CE).

In some examples, an indication to apply the beam indication set to multiple BWPs or CCs comprises an indication of the multiple BWPs or CCs.

In some examples, a reference signal in a beam indication of the configured beam indication set is associated with an unspecified or floating BWP identifier (ID) or CC ID. The reference signal may be located in a BWP and/or CC to which the configured beam indication set is applied.

In some examples, one or more of multiple BWPs and CCs are quasi co-located BWPs and CCs. In some examples, the quasi co-located BWPs and CCs share a same analog beam.

In some examples, a UE receives downlink control information (DCI) scheduling one or more transmissions and indicating one or more beam indications from the beam indication set. The beam indication set may be a TCI state set, the one or more transmissions may be one or more physical downlink shared channel (PDSCH) transmissions, and the UE can determine one or more UE receive beams for receiving the one or multiple PDSCH transmissions based on the indicated one or more TCI states. The beam indication set may be a spatial relation set, the DCI may indicate the one or more spatial relations directly via spatial relation identifiers (IDs) or indirectly via resource IDs associated with different spatial relation IDs, the one or more transmissions may be one or more physical uplink shared channel (PUSCH) transmissions, and the UE may determine one or more UE transmit beams for transmitting the one or more PUSCH transmissions based on the indicated one or more spatial relations.

In some examples, an indication to apply the beam indication set to multiple BWPs or CCs is an indication to apply the beam indication set to any BWP or CC when the BWP ID or CC ID is not indicated.

Certain aspects provide a method for wireless communications by a base station (BS). The method generally includes signaling a UE to configure the UE with a beam indication set. The method generally includes sending the UE an indication to apply the configured beam indication set to multiple BWPs and/or multiple CCs. The method generally includes applying the active beam indication set to a BWP or CC based on the indication.

In some examples, a beam indication set is a TCI state set, a spatial relation set, a set of candidate beam indications for activation, and/or a set of activated beam indications ready for communications.

In some examples, BS signals the configuration of the beam indication set and/or the indication via RRC signaling and/or a MAC-CE.

In some examples, an indication to apply the configured beam indication set to multiple BWPs or CCs comprises an indication of the multiple BWPs or CCs.

In some examples, a reference signal in a beam indication of the configured beam indication set is associated with an unspecified or floating BWP identifier (ID) or CC ID. The reference signal may be located in the BWP and/or CC to which the configured beam indication set is applied.

In some examples, one or more of multiple BWPs and CCs comprise quasi co-located BWPs and CCs. In some examples, the quasi co-located BWPs and CCs share a same analog beam. In some examples, the quasi co-located BWPs and CCs are determined based on UE feedback.

In some examples, a BS sends the UE DCI scheduling one or more transmissions and indicating one or more beam indications from the beam indication set. The beam indication set may be a TCI state set, the one or more transmissions may be one or more PDSCH transmissions, and the BS may determine one or more BS transmit beams for transmitting the one or more PDSCH transmissions based on the one or more indicated TCI states. The beam indication set may be a spatial relation set, the one or more spatial relations may be indicated directly via a spatial relation IDs or indirectly via resource IDs associated with the one or more spatial relations, the one or more transmissions may be one or more PUSCH transmissions, and the BS may determine one or more BS receive beams for receiving the one or more PUSCH transmissions based on the indicated one or more spatial relations.

In some examples, an indication to apply the beam indication set to multiple BWPs or CCs is an indication to apply the beam indication set to any BWP or CC when the BWP ID or CC ID is not indicated.

Certain aspects provide an apparatus for wireless communications, such as a UE. The apparatus generally includes means for receiving a configuration of a beam indication set. The apparatus generally includes means for receiving an indication to apply the beam indication set to multiple BWPs and/or multiple CCs. The apparatus generally includes means for applying the beam indication set to a BWP or CC based on the indication.

Certain aspects provide an apparatus for wireless communications, such as a BS. The apparatus generally includes means for signaling a UE to configure the UE with a beam indication set. The apparatus generally includes means for sending the UE an indication to apply the configured beam indication set to multiple BWPs and/or multiple CCs. The apparatus generally includes means for applying the beam indication set to a BWP or CC based on the indication.

Certain aspects provide an apparatus for wireless communications, such as a UE. The apparatus generally includes at least one processor coupled with a memory. The at least one processor is configured to receive a configuration of a beam indication set. The at least one processor is configured to receive an indication to apply the multiple beam indication set to multiple BWPs and/or multiple CCs. The at least one processor is configured to apply the beam indication set to =a BWP or CC based on the indication.

Certain aspects provide an apparatus for wireless communications, such as a BS. The apparatus generally includes at least one processor coupled with a memory. The at least one processor is configured to signal a UE to configure the UE with a beam indication set. The at least one processor is configured to send the UE an indication to apply the configured beam indication set to multiple BWPs or multiple CCs. The at least one processor is configured to apply the beam indication sets to a BWP or CC based on the indication.

Certain aspects provide a computer readable medium having computer executable code stored thereon for wireless communications. The computer readable medium generally includes code for receiving a configuration of a beam indication set. The computer readable medium generally includes code for receiving an indication to apply the beam indication set to multiple BWPs and/or multiple CCs. The computer readable medium generally includes code for applying the beam indication set to a BWP or CC based on the indication.

Certain aspects provide a computer readable medium having computer executable code stored thereon for wireless communications. The computer readable medium generally includes code for signaling a UE to configure the UE with a beam indication set. The computer readable medium generally includes code for sending the UE an indication to apply the configured beam indication set to multiple BWPs or multiple CCs. The computer readable medium generally includes code for applying the beam indication set to a BWP or CC based on the indication.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 3 illustrates example transmission configuration indication (TCI) state configuration.

FIG. 5 illustrates example transmission configuration indication (TCI) state configuration with floating bandwidth part (BWP) identifier (ID) and component carrier (CC) ID, in accordance with certain aspects of the present disclosure.

FIG. 6 illustrates example spatial reuse configuration with floating BWP ID and CCI, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
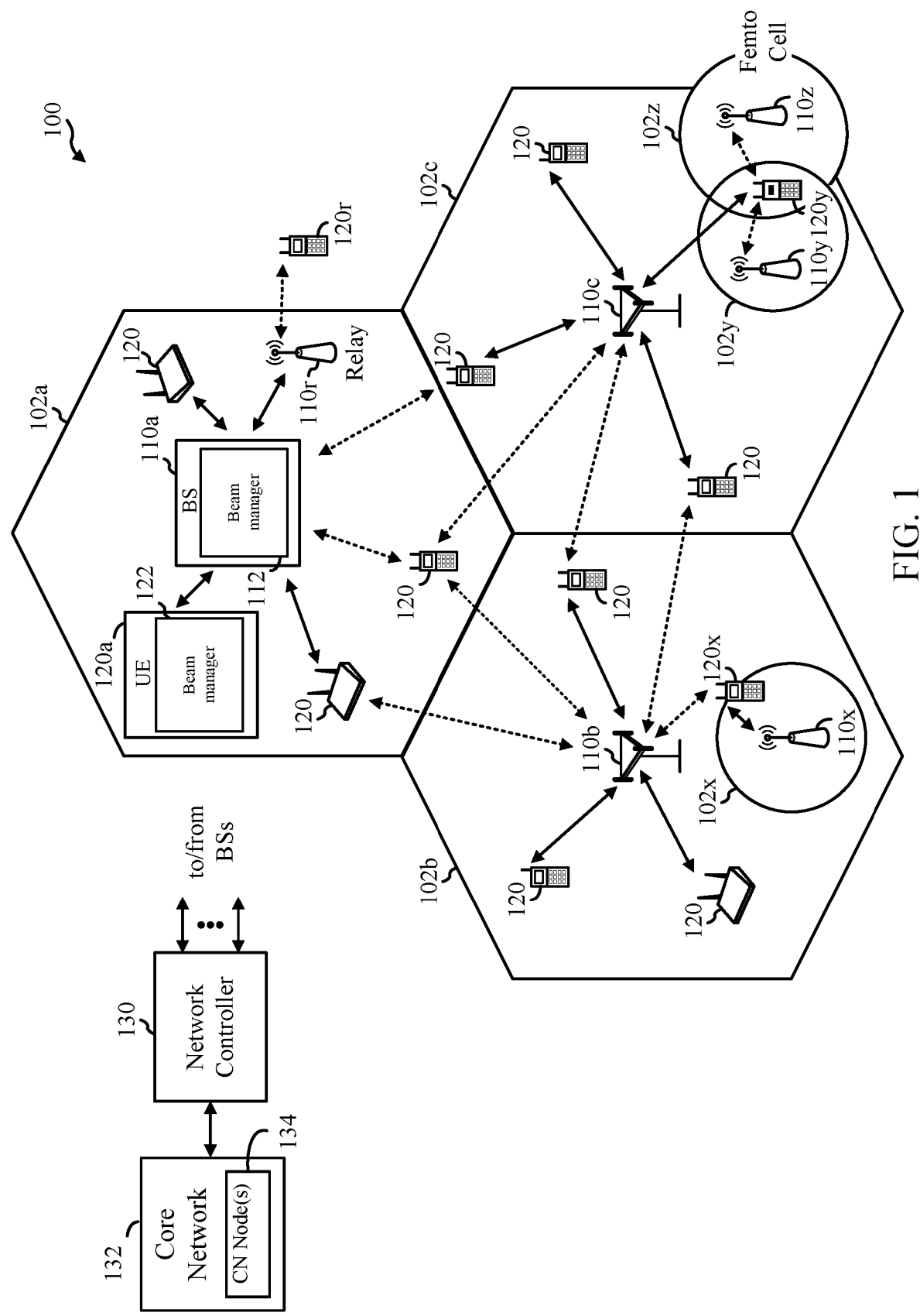
FIG. 1 is a block diagram conceptually illustrating an example telecommunications system, in accordance with certain aspects of the present disclosure.

Aspects of the present disclosure provide apparatus, methods, processing systems, and computer readable mediums related to wireless communication involving communication beams. Beams can be wireless transmission configured to be used for communication with one or more devices. Aspects discussed in this disclosure relate to efficient use of communication beams, including re-using beams for communication. In some examples, aspects can include conveying, providing, and/or generating control information to indicate beam re-use (e.g., signaling for and/or to express beam indication reuse).

In certain systems, such as new radio (e.g., 5G NR) systems, a user equipment (UE) can be configured with one or more active beam indication sets. For example, for uplink transmissions, the UE may be configured with a set of spatial relations. A beam indication set may allow the UE (and BS) to determine one or more receive beams and/or transmit beams to use for communication. For downlink transmissions, the UE may be configured with a set of transmission configuration indication (TCI) states. In some examples, for physical downlink shared channel (PDSCH) reception, the UE may be configured with a set of up to eight active TCI states. In some examples, the UE may be configured via higher layer signaling such as radio resource control (RRC) signaling with the set of beam indication sets. In some examples, for uplink physical shared channel (PUSCH) transmission, the UE may be configured with a set of spatial relations. A medium access control control element (MAC-CE) may be used to activate a subset of the beam indication sets. In some examples, downlink control information (DCI) may indicate one of the beam indications of the active beam indication set. For example, a 3-bit indicator in the DCI can indicate a TCI state that is valid for the scheduled PDSCH.

In certain systems, a base station (BS) can relay instructions to one or more UEs related to beam communications. For example, in some examples, a BS can configure a UE with up to 128 beam indications. The BS configures the beam indication sets per bandwidth part (BWP) and per component carrier (CC). Thus, there may be large overhead in signaling the UE to configure the beam indication sets (of up to 128 beam indications each) for multiple BWPs and multiple CCs. In some examples, some of the BWPs and/or CCs are quasi-colocated. That is, the same beam may be used on some BWPs and/or on some CCs (e.g., in the same band). However, the BS still configures separate beam indication sets for those BWPs and CCs.

Aspects of the present disclosure provide techniques, apparatus, processing systems, and computer readable media, for beam indication set reuse. For example, aspects of the present disclosure provide for the BWP identifier (ID) and/or CC ID to be unspecified (e.g., floating) for some beam indications sets (e.g., some TCI states and/or spatial relations), allowing those beam indication sets to be reused for some BWPs and/or CCs (e.g., BWPs and/or CCs that are QCL'd). The BS may signal the BWPs and/or CCs for which beam indication sets may be reused.

The following description provides examples of beam indication reuse, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. For clarity, while aspects may be described herein using terminology commonly associated with 3G, 4G, and/or 5G wireless technologies, aspects of the present disclosure can be applied in other generation-based communication systems, including later technologies.

NR may utilize orthogonal frequency division multiplexing (OFDM) on the downlink and/or uplink and single-carrier frequency division multiplexing (SC-FDM) on the uplink and/or downlink. NR may support half-duplex operation using time division duplexing (TDD). OFDM and SC-FDM partition the system bandwidth into multiple orthogonal subcarriers, are referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. For example, the based subcarrier spacing (SCS) may be 15 kHz and other SCS may be defined with respect to the base SCS (e.g., 30 kHz, 60 kHz, 120 kHz, 240 kHz, etc.). The minimum resource allocation (e.g., a resource block (RB)) may be 12 consecutive subcarriers (or 180 kHz). The system bandwidth may also be partitioned into subbands covering multiple RBs. In NR, a subframe is 1 ms, but the basic transmission time interval (TTI) is referred to as a slot. A subframe contains a variable number of slots (e.g., 1, 2, 4, 8, 16, . . . slots) depending on the SCS. The symbol, slot lengths, and CP scale with the SCS.

NR may support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110. The network controller 130 may communicate with the BSs 110 via a backhaul.

BSs 110 may communicate with UEs 120a-y (each also individually referred to herein as UE 120 or collectively as UEs 120) that may be dispersed throughout the wireless communication network 100. Each UE 120 may be stationary or mobile.

Wireless communication network 100 may also include relay stations (e.g., relay station 110r), also referred to as relays, relay UEs, relay BSs, or the link, that receive a transmission of data and/or other information from an upstream station (e.g., a BS 110a or a UE 120r) and sends a transmission of the data and/or other information to a downstream station (e.g., a UE 120 or a BS 110), or that relays transmissions for other UEs 120 to facilitate communication between devices.

The BSs 110 and UEs 120 may be configured for beam indication reuse. For example, as shown in FIG. 1, the BS 110a has a beam manager 112 that may be configured to configure the UE 120a with a beam indication set, signal the UE 120a an indication to apply the beam indication set to multiple BWPs and/or multiple CCs, and apply the beam indication set of a BWP or CC based on the indication, according to aspects described herein. As shown in FIG. 1, the UE 120a has a beam manager 122 that may be configured to receive the beam indication set configuration, receive the indication to apply the beam indication set of multiple BWPs and/or CCs, and to apply the beam indication to a BWP or CC based on the indication, according to aspects described herein.

Figure 2:
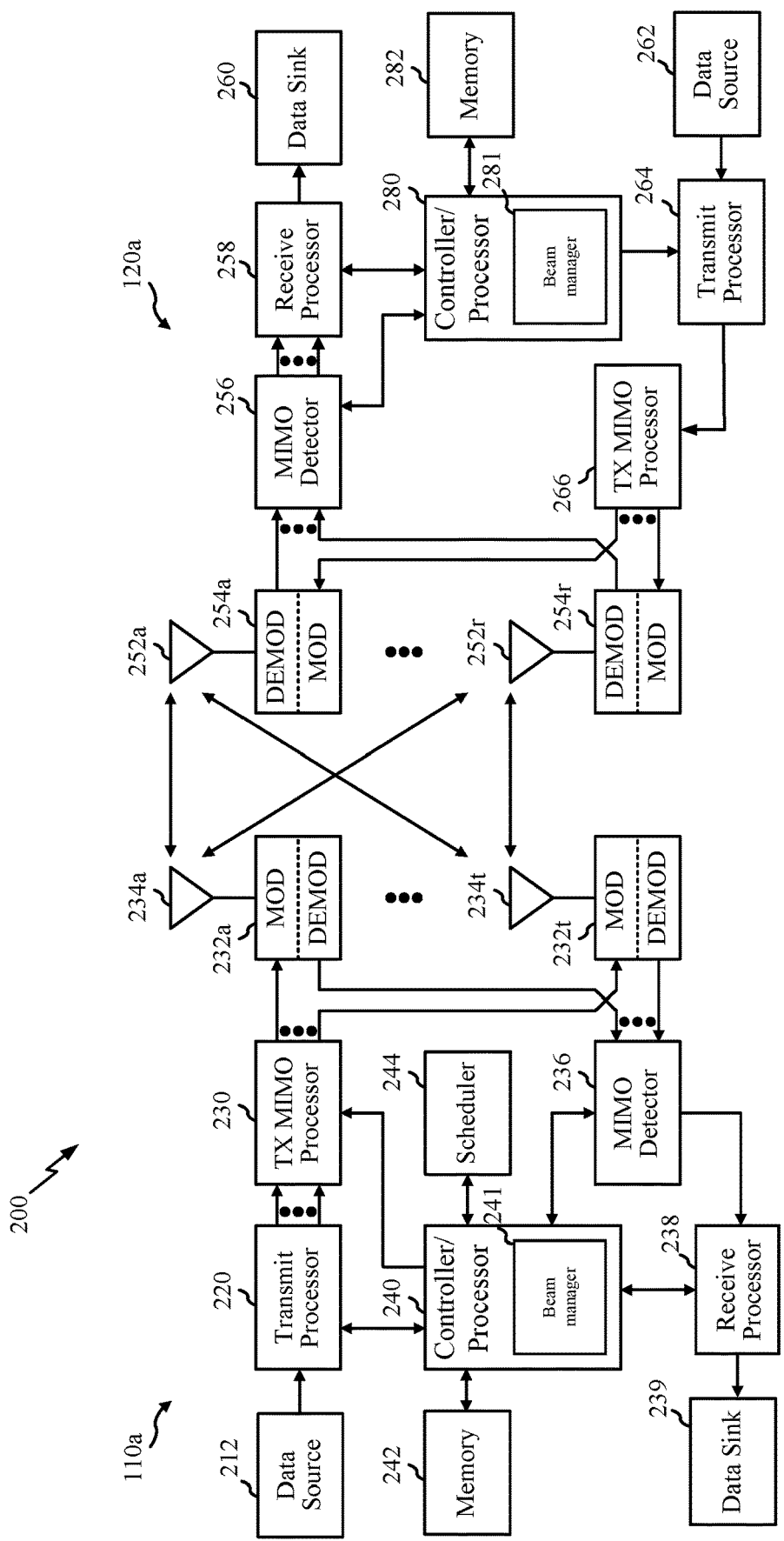
FIG. 2 is a block diagram illustrating an example architecture of a distributed radio access network (RAN), in accordance with certain aspects of the present disclosure.

FIG. 2 illustrates example components of a BS 110a and a UE 120a which may be used to implement aspects of the present disclosure. At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a beam manager 241 and the controller/processor 280 UE 120a has a beam manager 281, that may be configured for beam indication reuse, according to aspects described herein. The memories 242 and 282 may store data and program codes for BS 110 and UE 120, respectively. A scheduler 244 may schedule UEs for data transmission on the downlink and/or uplink.

As mentioned above, aspects of the present disclosure relate to beam indication sets. Beam indication sets can include one or more indications for indicating beams to use for communications. The indications and sets can be communicated between communication devices illustrated herein in various manners (e.g., in control channels and/or between UE and BS). Beam indication sets may be associated with quasi-colocation (QCL) relations/parameters.

QCL signaling can occur in a variety of manners. In some examples, QCL signaling can be used for reference signals (RS) and channels across scenarios involving multiple cells, such as coordinated multipoint (CoMP) scenarios. In some CoMP scenarios, multiple transmit receive points (TRPs) and/or integrated access and backhaul (IAB) nodes may each have their own cell identification (ID).

QCL assumptions generally refer to assumptions that, for a set of signals or channels considered to be QCL related (or "QCL'd"), certain characteristics derived for (measured from) one of the signals or channels may be applied to the other. As an example, if PDSCH demodulation reference signal (DMRS) is QCL'd with other DL RS, a UE may process PDSCH based on measurements of the other DL RS. In some cases, this may lead to more efficient processing, allowing a UE to use (re-use) previous measurements of the QCL'd RS, which may speed processing of a current channel.

In some cases, QCL assumptions for receptions/transmissions of signals and channels may be signaled in a dedicated manner. As one example, communications can be made via a mechanism referred to as Transmission Configuration Indication (TCI) states, sometimes also referred to as Transmission Configuration Indicator states. In some cases, a UE may be configured with multiple TCI states (e.g., via radio resource control (RRC) signaling), while one of the TCI states may be indicated by an N bit (e.g., 3-bits) downlink control information (DCI) field for PDSCH. A field (e.g., a qcl-info field) in an RRC message can list references to TCI states for providing the QCL source and QCL type for associated resources. The TCI states may be indicated by an ID (e.g., a TCI-StateId). An RRC message (e.g., PDSCH-Config field) can contain a field with a list of TCI states indicating a transmission configuration which includes QCL-relationships between the DL RSs in one RS set and the PDSCH DMRS ports. A TCI state associates DL RSs (e.g., one or two) with a corresponding QCL type. A DL BWP and cell, in which the RS is located, may also be indicated.

FIG. 3 illustrates an example of an RRC message for configuring RSs associated with TCI states. The QCL assumptions may be grouped into different types. In some examples, the various types may correspond to the parameters that may be assumed QCL'd for a set of QCL'd signals. For example, for a set of QCL'd signals, Type A may indicate that Doppler shift, Doppler spread, average delay, delay spread can be assumed QCL'd, while Type B may indicate only Doppler shift and Doppler spread, Type C may indicate a still different set of parameters. In some cases, spatial QCL assumptions may be indicated, for example, by Type D. Spatial QCL may mean a (Tx or Rx) beam selected based on a certain signal measurement may be applied to the QCL related signal. If at least spatial QCL is configured/indicated, an RRC field (e.g., a tci-PresentInDCI field) can indicate if TCI field is present or not present in DL-related DCI and when the field is absent the UE considers the TCI to be absent/disabled.

As illustrated in FIG. 3, the TCI State field may indicate which RS are QCL'd and the QCL type. The TCI State field may also indicate a ServCellIndex that is a short identity used to identify a serving cell, such as a primary cell (PCell) or a secondary cell (Scell) in a carrier aggregation (CA) deployment. A value of 0 for this field may indicate the PCell, while the SCellIndex that has previously been assigned may apply for SCells.

In some examples, the UE can be configured with a list of up to M TCI states. This may include, for example, by a higher layer parameter to decode PDSCH according to a detected PDCCH with DCI intended for the UE and the given serving cell, where M depends on the UE capability. Each TCI state is associated with parameters for configuring a QCL relationship between one or two downlink RSs and the DM-RS ports of the PDSCH. The QCL relationship is configured by higher layer parameters for the first and second DL RSs, respectively. For the case of two DL RSs, the QCL types may not be the same, regardless of whether the references are to the same DL RS or different DL RSs. The QCL types corresponding to each DL RS are given by another higher layer parameter and may indicate the QCL Type A, QCL Type B, QCL Type C, or QCL type D.

In some examples, the UE may receive an activation command (e.g., in a MAC-CE) via downlink signaling. The activation command may map one or more of the higher layer configured TCI states (e.g., up to 8 TCI states) to the codepoints of a TCI field in DCI.

For the uplink transmissions, a spatial relation parameter may be used. The spatial relation parameter may configure the spatial relation between a reference RS (e.g., SSB, CSI-RS, and/or SRS) and an uplink transmission (e.g., PUCCH, PUSCH, SRS). The UE can be configured with a set of spatial relations via higher layer signaling (e.g., RRC). A MAC-CE can be used to select a subset (e.g., a single) spatial relation. From the spatial relation, the UE may decide a UE transmit beam to use for uplink transmission.

In some examples, a subset of the configured sets may be controlled separately. For example, in some scenarios, a subset of configured sets can be activated (e.g., via a MAC-CE). The indicated TCI state or spatial relation may indicate to the UE the receive beam or transmit beam to use, respectively.

In certain systems (e.g., such as 5G NR), the BS configures the UE with up to 128 beam indications. The BS may configure the beam indication sets per bandwidth part (BWP) and per component carrier (CC). Thus, there may be large overhead in signaling the UE to configure the beam indication sets (of up to 128 beam indications each) for multiple BWPs and multiple CCs. In some examples, some of the BWPs and/or CCs are quasi-colocated (e.g., spatially QCL'd). That is, the same analog beam may be used by some BWPs and/or on some CCs in the same band. However, the BS still configures separate beam indication sets for those BWPs and CCs.

Therefore, approaches for reducing overhead for the beam indication set configuration are desirable.

Example Beam Indication Reuse

Aspects of the present disclosure provide techniques, apparatus, processing systems, and computer readable media, for beam indication reuse. A beam indication set may refer to a transmission configuration indication (TCI) state set for downlink and/or a spatial relation set for uplink. Aspects of the present disclosure provide for beam indication sets with a floating bandwidth part (BWP) identifier (ID) and/or with a floating component carrier (CC) ID to indicate that the beam indication set can be reused for multiple BWPs and/or CCs. Reusing (or recycling) beams can make efficient use of beams and help promote improved communications. Thus, the BS can configure fewer beam indication sets than a total number of the configured BWPs and CCs, thereby reducing signaling overhead.

Figure 4:
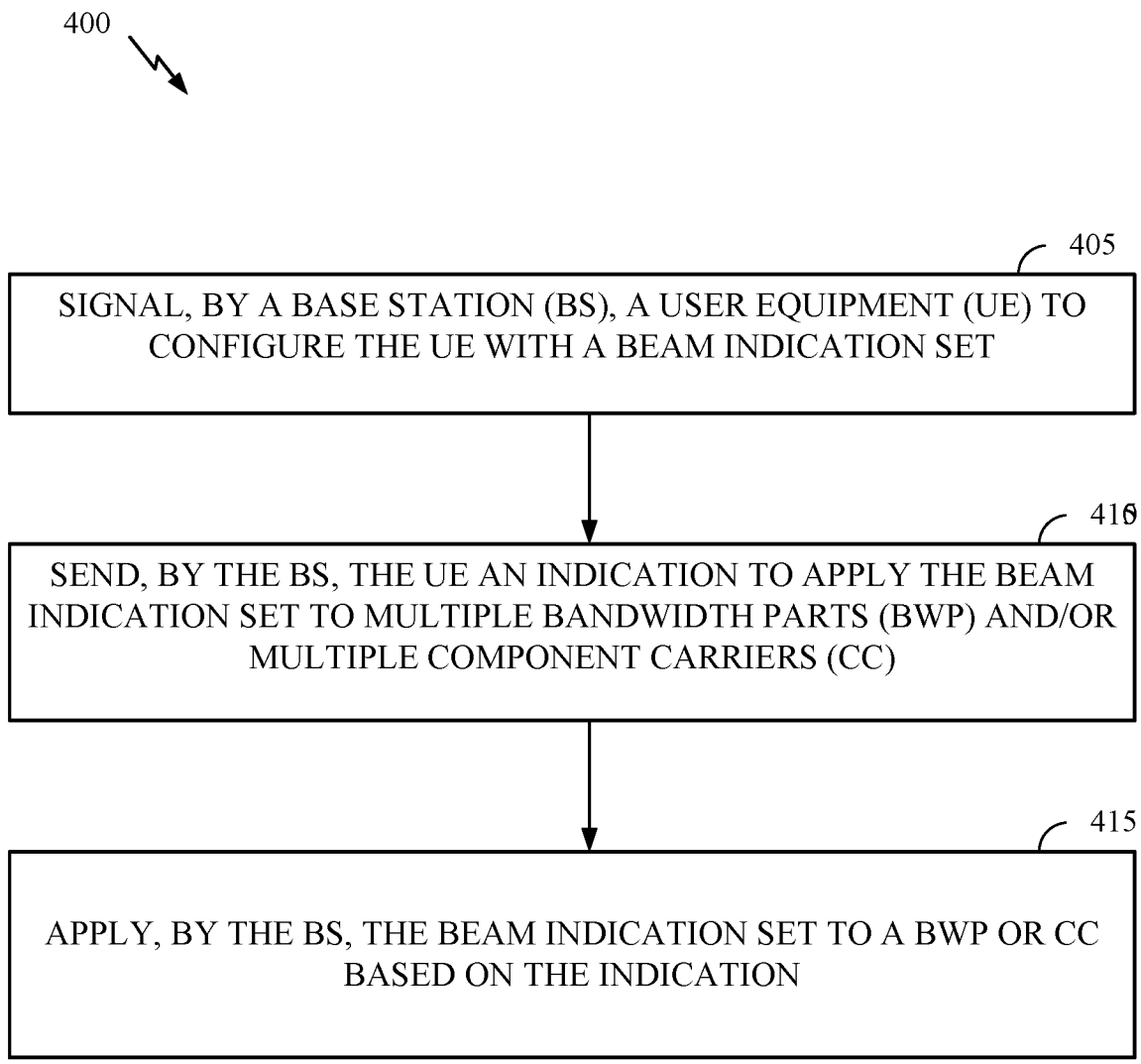
FIG. 4 is a flow diagram illustrating example operations for wireless communication by a BS, in accordance with certain aspects of the present disclosure.

FIG. 4 is a flow diagram illustrating example operations 400 for wireless communication, in accordance with certain aspects of the present disclosure. The operations 400 may be performed, for example, by a BS (e.g., such as a BS 110a in the wireless communication network 100). Operations 400 may be implemented as software components that are executed and run on one or more processors (e.g., controller/processor 240 of FIG. 2). Transmission and reception of signals by the BS in operations 400 may be enabled, for example, by one or more antennas (e.g., antennas 234 of FIG. 2). In certain aspects, transmission and/or reception of signals by the BS may be implemented via a bus interface of one or more processors (e.g., controller/processor 240) obtaining and/or outputting signals.

The operations 400 may begin, at 405, by signaling a UE to configure the UE with a beam indication set. In some examples, the beam indication set includes a TCI state set and/or a spatial relation set. In some examples, a BS configures the beam indication set via radio resource signal (RRC) signaling or a medium access control element (MAC-CE). In some examples, the BS configures the UE with a plurality of BWPs and CCs. The number of the configured beam indication sets may include fewer sets than a total number of the configured BWPs and CCs.

At 410, the BS sends the UE an indication to apply the configured beam indication set to multiple BWPs and/or multiple CCs. In some examples, the configured beam indication set to be applied includes an unspecified or floating BWP ID or CC ID. For example, an unspecified or floating BWP ID or CC ID may indicate that the beam indication can be applied to any BWP or CC. In some examples, the BS indicates the BWPs or CCs to which the beam indication set can be applied (e.g., reused). In some examples, the BS indicates to apply the configured beam indication set via RRC signaling and/or a MAC-CE. In some examples, the multiple BWPs and CCs for which the beam indication set can be reused are quasi co-located (QCL'd), such as only indicating BWPs and CCs that are QCL'd.

In some examples, the BS selects the active BWP for a beam indication set when the BWP ID of the beam indication set is unspecified or floating, and selects the CC where the beam indication set is configured for a beam indication set when the CC ID of the beam indication set is unspecified or floating.

At 415, the BS applies the beam indication set to a BWP or CC based on the indication.

In some example, the BS transmits DCI scheduling a transmission. The DCI may also indicate a beam, of the determined active beam indication set, valid for the transmission. For downlink, the DCI may indicate a TCI state for a PDSCH transmission. The BS can determine one or more transmit beams for transmitting the PDSCH based on the indicated TCI state. For uplink, the DCI may indicate a spatial relation for a PUSCH. The BS can determine one or more receive beams for receiving the PUSCH based on the indicated spatial relation.

According to certain aspects, when a TCI state is reused across BWPs/CCs, the BWP/CC ID of the RS can be unspecified in the TCI state (e.g., in the TCI state information element (IE)). In some examples, when the BWP ID is not specified, it is the active BWP ID. In some examples, when the CC ID is not specified, it is the CC where the TCI state is configured. Thus, the same set of TCI states can be reused across those BWPs/CCs. FIG. 5 illustrates an example RRC field configuring a TCI state with floating BWP ID and floating CC ID, in accordance with certain aspects of the present disclosure.

According to certain aspects, when spatial relation information is reused across BWPs/CCs, the BWP/CC ID of the RS can be unspecified in the spatial relation (e.g., the spatial relation IE). In some examples, when the BWP ID is not specified, it is the active BWP ID. In some examples, when the CC ID is not specified, it is the CC where the spatial relation is configured. Thus, the same set of spatial relations can be reused across those BWPs/CCs. FIG. 6 illustrates an example RRC field configuring a spatial relation with floating BWP ID and floating CC ID, in accordance with certain aspects of the present disclosure.

In some examples, the beam indication set is a set of candidate beam indications for activation. In some examples, the beam indication set is a set of activated beam indications ready for communications. In some examples, a reference signal in a beam indication of the configured beam indication set that are applied to multiple BWPs or CCs is associated with an unspecified or floating BWP ID or CC ID.

Figure 7:
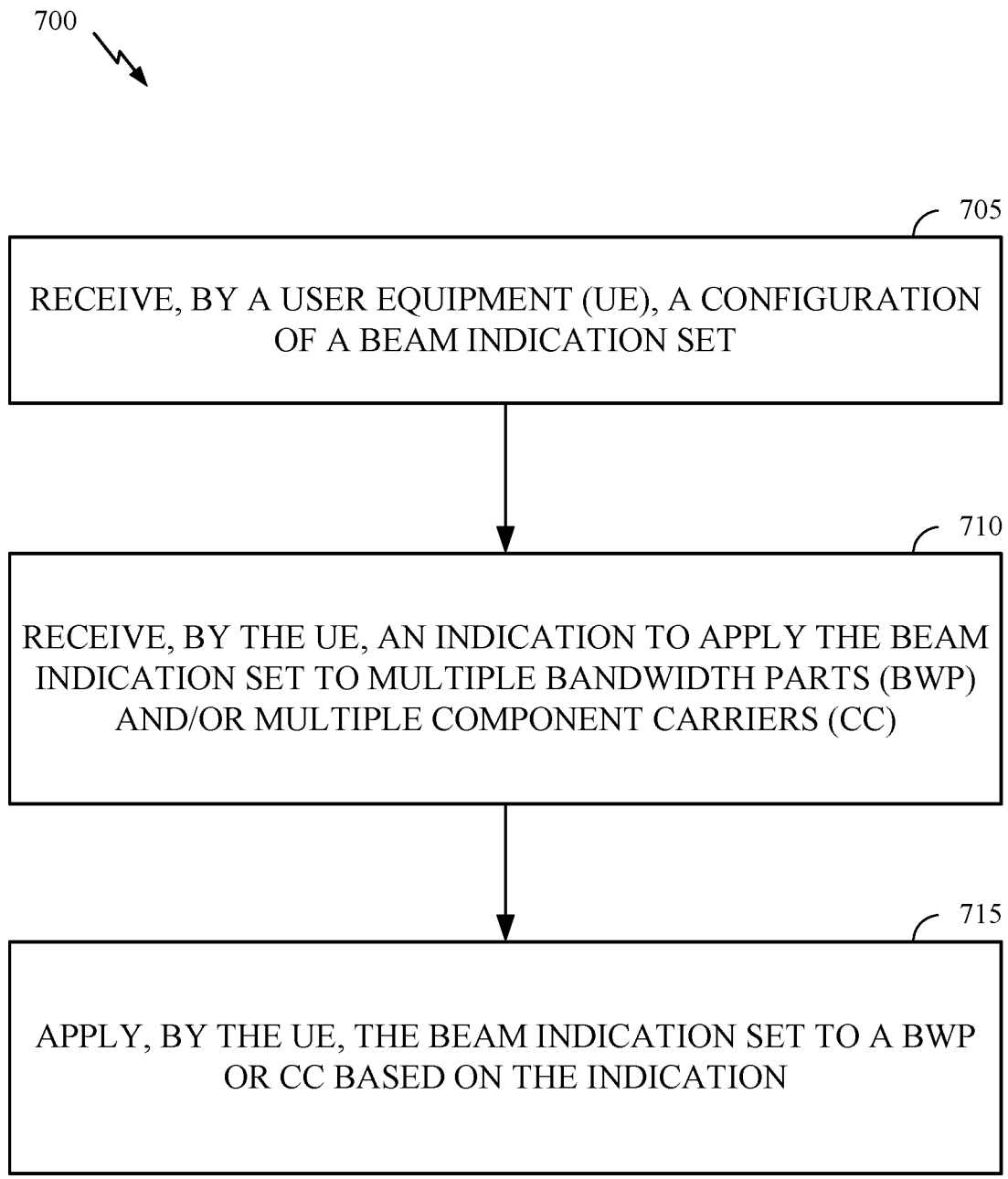
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by UE (e.g., such as a UE 120 in the wireless communication network 100). The operations 700 may be complimentary operations by the UE to the operations 600 performed by the BS. Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 705, by receiving a configuration of a (e.g., or one or more) beam indication set. In some examples, the beam indication set includes TCI state set and/or a spatial relation set. In some examples, the UE receives the configuration via RRC signaling and/or a MAC-CE. In some examples the UE is configured with a plurality of BWPs and CCs, and a number of the configured multiple beam indication sets is less than a total number of the configured BWPs and CCs.

At 710, the UE receives an indication to apply the configured beam indication set to multiple BWPs and/or multiple CCs. In some examples, the one or more of the configured multiple beam indication sets that are associated with the multiple BWPs or CCs include an unspecified or floating BWP ID or CC ID. In some examples, the indication of one or more of the configured multiple beam indication sets that are associated with the multiple BWPs or CCs includes an indication of the BWPs or CCs associated with the beam indication set. The UE can determine to reuse the beam indication set when the BWP or CC ID is unspecified or floating. In some examples, the UE receives the indication to apply the configured beam indication set to multiple BWPs or CCs via RRC signaling and/or a MAC-CE. In some examples, the multiple BWPs and CCs include (QCL'd) BWPs and CCs.

At 715, the UE applies the beam indication set to a BWP or CC based on the indication. In some examples, the UE determines the active BWP for a beam indication set when the BWP ID of the beam indication set is unspecified or floating, and determines the CC where the beam indication set is configured for a beam indication set when the CC ID of the beam indication set is unspecified or floating.

In some examples, the UE receives DCI scheduling a transmission and indicating a beam indication, of the determined active set of beam indication sets, valid for the transmission. In some examples, the beam indication sets include TCI state sets, the DCI schedules a PDSCH transmission and indicates a TCI state, and the UE determines one or more UE receive beams for receiving the PDSCH based on the indicated TCI state. In some examples, the beam indication sets includes spatial relation sets, the DCI schedules an uplink transmission and indicates a spatial relation, and the UE determines one or more UE transmit beams for transmitting the uplink transmission based on the indicated spatial relation.

Figure 8:
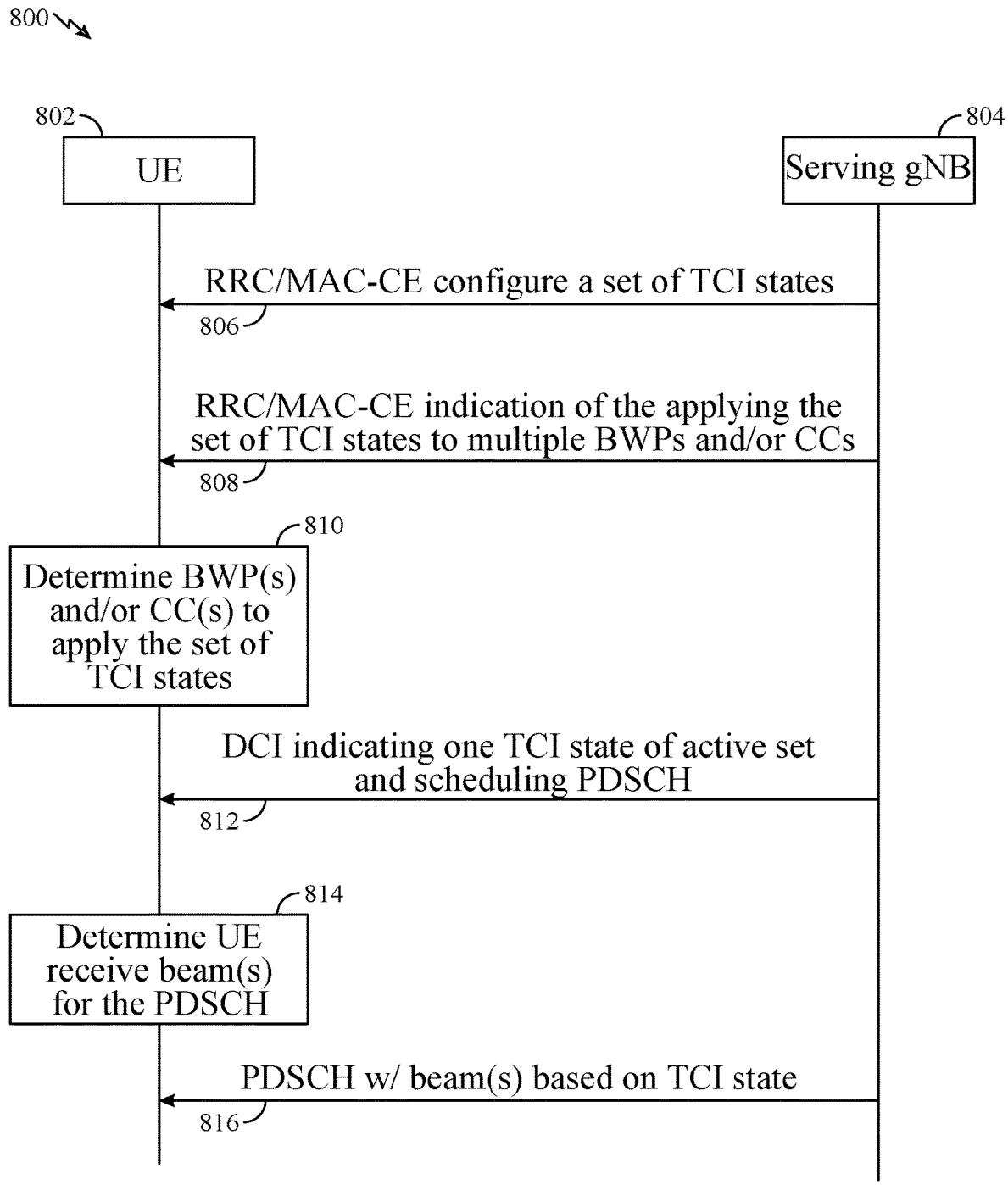
FIG. 8 is a call flow diagram illustrating example signaling for downlink beam indication set reuse, in accordance with certain aspects of the present disclosure.

FIG. 8 is a call flow diagram illustrating example signaling 800 for downlink beam indication set reuse, in accordance with certain aspects of the present disclosure. As shown in FIG. 8, at 806, a UE 802 may receive RRC and/or MAC-CE signaling from the gNB 804 configuring a set of TCI states. At 808, the UE 802 receives RRC signaling or a MAC-CE from the serving gNB 804 with an indication to apply the set of TCI states to multiple BWPs and/or CCs. The indicated sets of TCI states may have unspecified (e.g., floating) BWP IDs and/or CC IDs (e.g., as shown in FIG. 5). At 810, the UE 802 determines the BWP(s) and/or CC(s) to apply the set of TCI states. For example, based on the indication received from the serving gNB 804, the UE 802 can determine the TCI state set for the current BWP or CC. At 812, the UE 802 may receive DCI from the serving gNB 804 indicating one TCI state of the active set of TCI states and scheduling a PDSCH. At 814, the UE 802 may determine one or more UE receive beams for receiving the PDSCH. And at 816, the UE 802 receives the PDSCH transmitted based on the indicated TCI state and determined beams.

Figure 9:
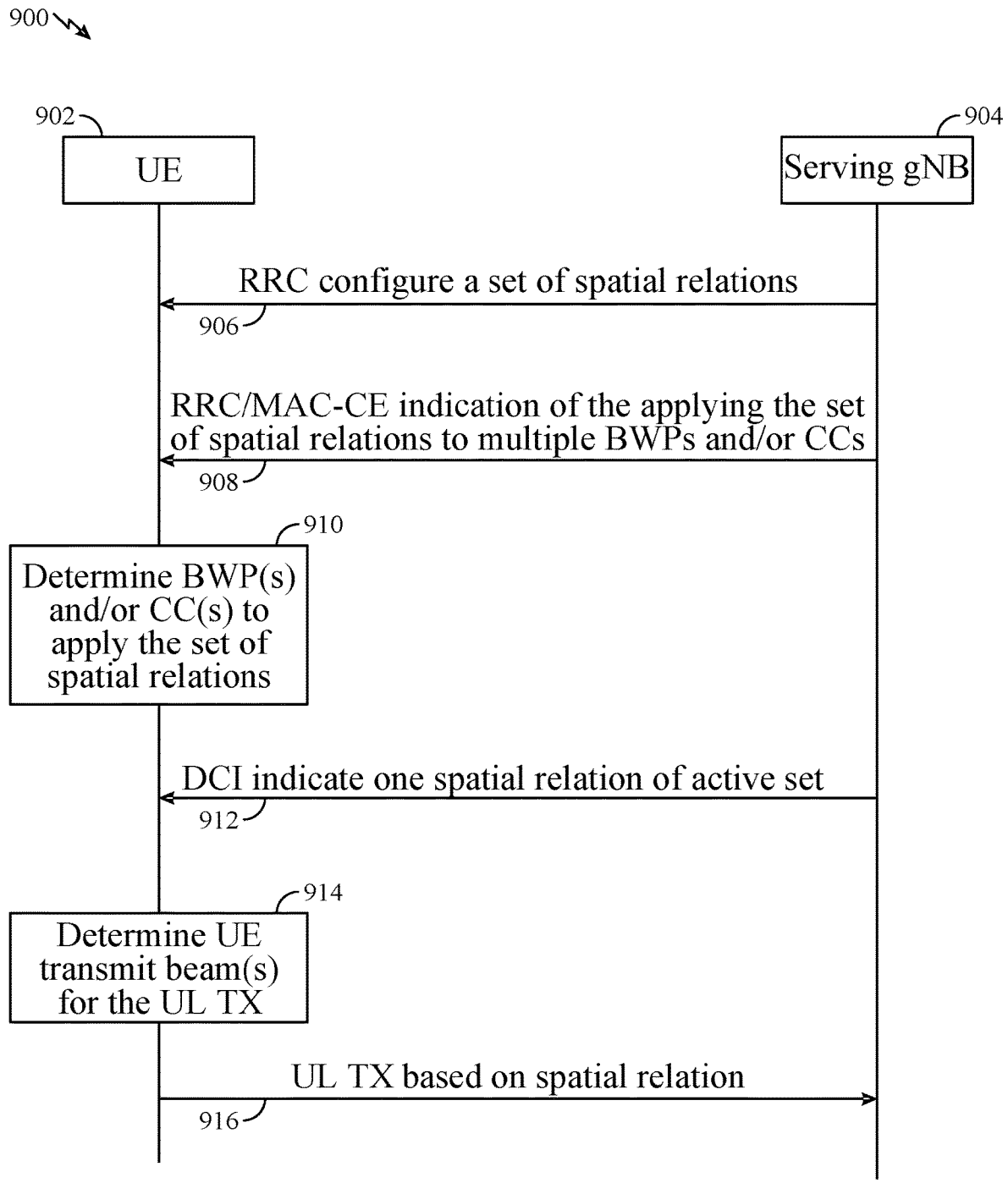
FIG. 9 is a call flow diagram illustrating example signaling for uplink beam indication set reuse, in accordance with certain aspects of the present disclosure.

FIG. 9 is a call flow diagram illustrating example signaling 900 for uplink beam indication set reuse, in accordance with certain aspects of the present disclosure. As shown in FIG. 9, at 906, a UE 902 may receive RRC and/or MAC-CE signaling from the serving gNB 904 configuring a set of spatial relations. At 908, the UE receives RRC signaling and/or a MAC-CE from the serving gNB 904 indicating to apply the set of spatial relations to multiple BWPs and/or CCs. The indicated sets of TCI states may have unspecified (e.g., floating) BWP IDs and/or CC IDs. At 910, the UE 902 determines the BWP(s) or CC(s) to apply the set of spatial relations based on the indication. For example, based on the indication received from the serving gNB 904, the UE 902 can determine the active spatial relation set for the current BWP or CC. At 912, the UE 902 may receive DCI from the serving gNB 904 indicating one spatial relation of the active set of spatial relations and scheduling an uplink transmission (UL TX). At 914, the UE 902 may determine one or more UE transmit beams for transmitting the uplink transmission. And at 916, the UE 902 transmits the uplink transmission based on the indicated spatial relation and determined beams.

In some cases, multiple CCs can be active at the same time while there may only be one active BWP. Beam indication set configuration overhead can be reduced by reusing the beam indication set in different BWPs and in different CCs. In some examples, a BWP part field and a serving cell index field (or subfields of QCL-Info field) may including unspecified or floating BWP and CC IDs. Thus, the same set of TCI states for different CCs may only be specified once for the UE. A separate part of the RRC message may specify the CCs for which the set applies.

Figure 10:
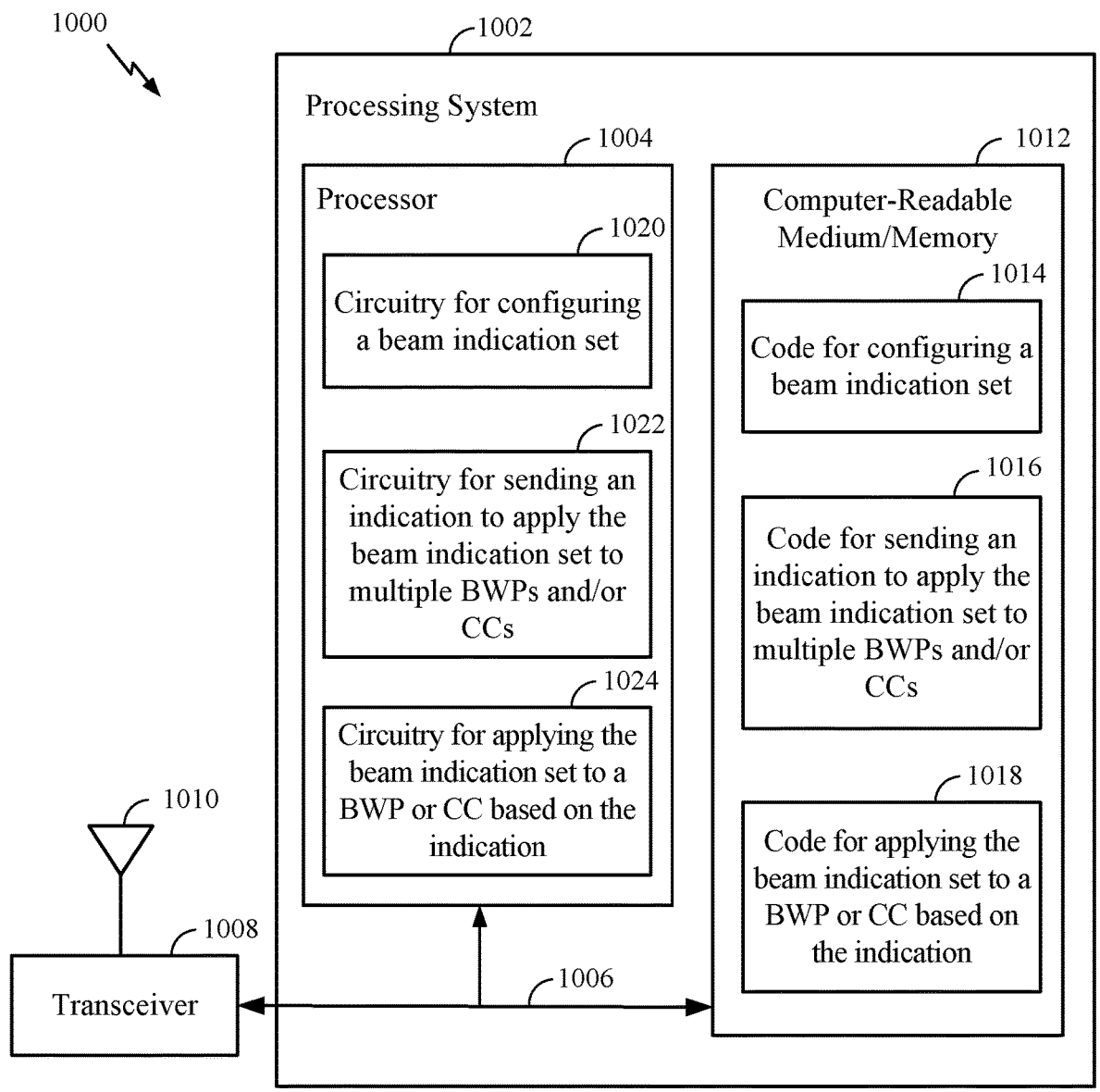
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 4. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 4, or other operations for performing the various techniques discussed herein for dynamic beam indication set determination. In certain aspects, computer-readable medium/memory 1012 stores code 1014 for signaling a UE to configure the UE with a beam indication set; code 1016 for sending the UE an indication to apply the configured beam indication set to multiple BWPs and/or multiple CCs; and code 1018 for applying the beam indication set to a BWP or CC based on the indication. In certain aspects, the processor 1004 has circuitry configured to implement the code stored in the computer-readable medium/memory 1012. The processor 1004 includes circuitry 1020 for signaling a UE to configure the UE with a beam indication set; circuitry 1022 for sending the UE an indication to apply the configured beam indication set to multiple BWPs and/or multiple CCs; and circuitry 1024 for applying the beam indication set to a BWP or CC based on the indication.

Figure 11:
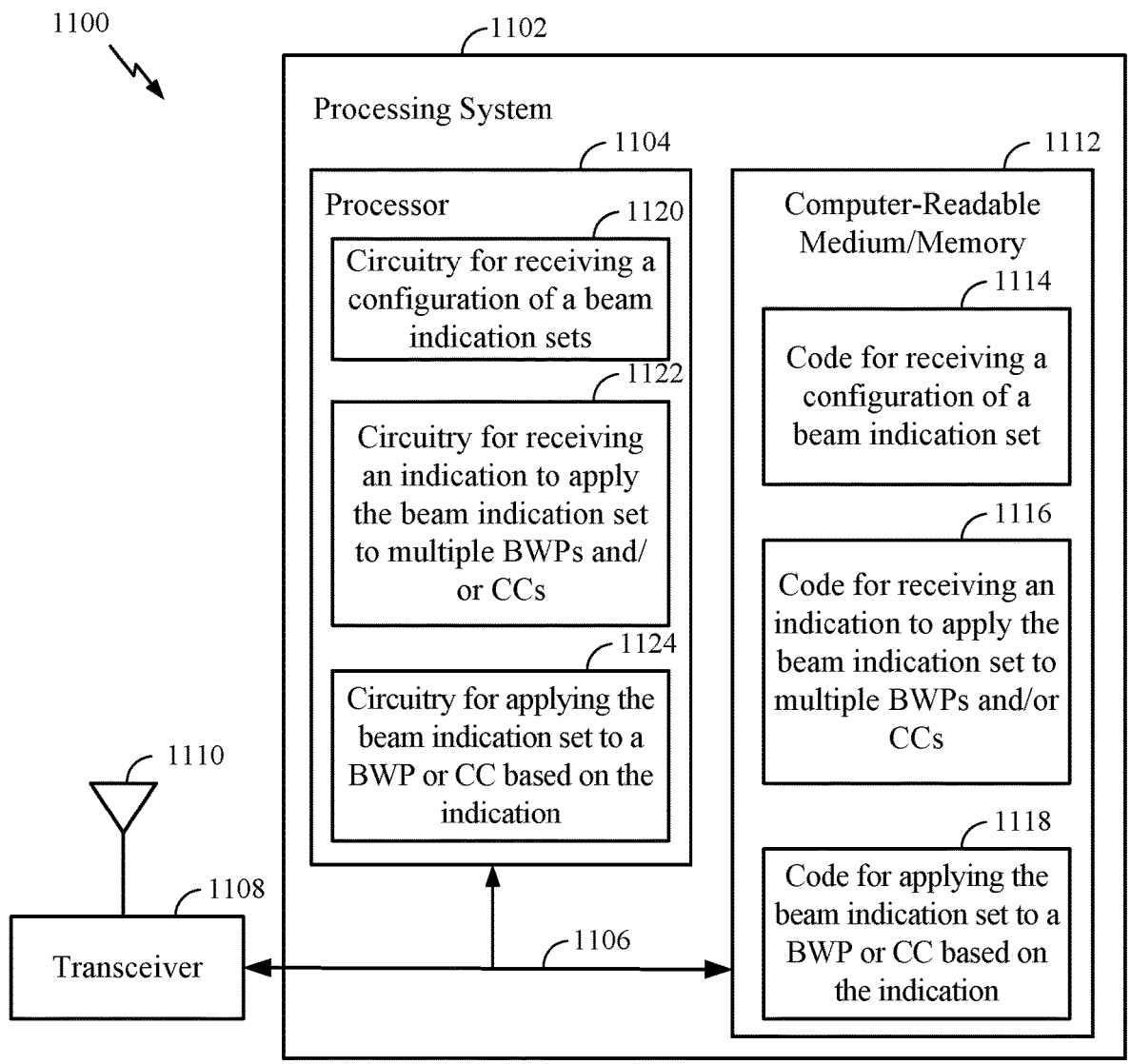
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 7. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 7, or other operations for performing the various techniques discussed herein for dynamic beam indication set determination. In certain aspects, computer-readable medium/memory 1112 stores code 1114 for receiving a configuration of a beam indication set; code 1116 for receiving an indication to apply the configured beam indication set to multiple BWPs and/or multiple CCs; and code 1118 for applying the beam indication set to a BWP or CC based on the indication. In certain aspects, the processor 1104 has circuitry configured to implement the code stored in the computer-readable medium/memory 1112. The processor 1104 includes circuitry 1120 for receiving a configuration of a beam indication set; circuitry 1122 for receiving an indication to apply the configured beam indication set to multiple BWPs and/or multiple CCs; and circuitry 1124 for applying the beam indication set to a BWP or CC based on the indication.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

NR is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 4 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, the apparatus comprising:
   a memory; and
   at least one processor coupled with the memory, wherein the at least one processor is configured to:
   receive a configuration of a beam indication set including a reference signal for which a bandwidth part (BWP) identification (ID) is unspecified; and
   apply, based on the BWP ID being unspecified, the beam indication set to an active BWP.

2. The apparatus of claim 1, wherein the BWP ID being unspecified or the CC ID being unspecified is indicative that the beam indication set is available to be reused.

3. The apparatus of claim 1, wherein the beam indication set comprises a transmission configuration indication (TCI) state set.

4. The apparatus of claim 1, wherein the beam indication set comprises a spatial relation set, a set of candidate beam indications for activation, or a set of activated beam indications ready for communications.

5. The apparatus of claim 1, wherein, to receive the configuration, the at least one processor is configured to receive the configuration via radio resource control (RRC) signaling.

6. The apparatus of claim 1, wherein, to receive the configuration, the at least one processor is configured to receive the configuration via a medium access control control element (MAC-CE).

7. The apparatus of claim 1, wherein the reference signal is located in the active BWP or a particular CC to which the beam indication set is applied.

8. The apparatus of claim 1, wherein the at least one processor is further configured to:
   apply, based a CC ID being unspecified, the beam indication set to a CC where the beam indication set is configured.

9. A first apparatus for wireless communication, the first apparatus comprising:
   a memory; and
   at least one processor coupled with the memory, wherein the at least one processor is configured to:
   signal a second apparatus to configure the second apparatus with a beam indication set including a reference signal for which a bandwidth part (BWP) identification (ID) is unspecified; and
   apply, based on the BWP ID being unspecified, the beam indication set to an active BWP.

10. The first apparatus of claim 9, wherein the BWP ID being unspecified is indicative that the beam indication set is available to be reused.

11. The first apparatus of claim 9, wherein the beam indication set comprises a transmission configuration indication (TCI) state set.

12. The first apparatus of claim 9, wherein the beam indication set comprises a spatial relation set, a set of candidate beam indications for activation, or a set of activated beam indications ready for communications.

13. The first apparatus of claim 9, wherein, to signal the second apparatus to configure the second apparatus with the beam indication set, the at least one processor is configured to signal the second apparatus via radio resource control (RRC) signaling.

14. The first apparatus of claim 9, wherein, to signal the second apparatus to configure the second apparatus with the beam indication set, the at least one processor is configured to signal the second apparatus via a medium access control element (MAC-CE).

15. The first apparatus of claim 9, wherein the reference signal is located in the active BWP or a particular CC to which the beam indication set is applied.

16. The first apparatus of claim 9, wherein the at least one processor is further configured to:
apply, based a CC ID being unspecified, the beam indication set to a CC where the beam indication set is configured.

17. A method for wireless communication, the method comprising:
receiving a configuration of a beam indication set including a reference signal for which a bandwidth part (BWP) identification (ID) is unspecified; and
applying, based on the BWP ID being unspecified, the beam indication set to an active BWP.

18. The method of claim 17, wherein the BWP ID being unspecified is indicative that the beam indication set is available to be reused.

19. The method of claim 17, wherein the reference signal is located in the active BWP or a particular CC to which the beam indication set is applied.

20. The method of claim 17, further comprising:
applying, based a CC ID being unspecified, the beam indication set to a CC where the beam indication set is configured.

21. A method for wireless communication, the method comprising:
signaling, from a first apparatus to a second apparatus, to configure the second apparatus with a beam indication set including a reference signal for which a bandwidth part (BWP) identification (ID) is unspecified; and
applying, based on the BWP ID being unspecified, the beam indication set to an active BWP.

22. The method of claim 21, wherein the BWP ID being unspecified is indicative that the beam indication set is available to be reused.

23. The method of claim 21, wherein the reference signal is located in the active BWP or a particular CC to which the beam indication set is applied.

24. The method of claim 21, further comprising:
applying, based a CC ID being unspecified, the beam indication set to a CC where the beam indication set is configured.

* * * * *